: US005758265A

United States Patent [19]

Okanobu

[11] Patent Number: 5,758,265
[45] Date of Patent: May 26, 1998

[54] TRANSMITTING AND RECEIVING APPARATUS FOR INCORPORATION INTO AN INTEGRATED CIRCUIT

[75] Inventor: Taiwa Okanobu, Tokyo, Japan

[73] Assignee: Sony Corporation, Tokyo, Japan

[21] Appl. No.: 574,383

[22] Filed: Dec. 18, 1995

[30] Foreign Application Priority Data

Dec. 27, 1994 [JP] Japan ................... 6-338120

[51] Int. Cl.$^6$ ................... H04B 1/40
[52] U.S. Cl. ................... 455/76; 455/87; 455/318; 455/264; 331/2; 331/8; 331/177 R; 331/108 R
[58] Field of Search ................... 455/75, 76, 84, 455/85, 86, 87, 260, 318, 319, 89, 161.1, 165.1, 168.1, 169.1, 178.1, 179.1, 180.3, 183.1, 191.1, 196.1, 255, 256, 264, 265, 315, 73; 331/177 R, 2, 8, 108 R, 167; 379/61

[56] References Cited

U.S. PATENT DOCUMENTS

| 4,057,760 | 11/1977 | Koch ................... 455/168.1 |
| 4,380,827 | 4/1983 | Moon ................... 455/179.1 |
| 5,566,360 | 10/1996 | Fenk et al. ................... 455/85 |

FOREIGN PATENT DOCUMENTS 0197811  11/1978  United Kingdom ................... 331/2

OTHER PUBLICATIONS

International Application WO 93/16530 A1, Aug. 19, 1993.

*Primary Examiner*—Reinhard J. Eisenzopf
*Assistant Examiner*—Doris To
*Attorney, Agent, or Firm*—Jay H. Maioli

[57] ABSTRACT

A transmitting and receiving apparatus configured in superheterodyne form, includes a receiving circuit for receiving a signal on one channel of a predetermined pair of channels and a transmitting circuit for transmitting a signal on the other channel of the predetermined pair of channels. The receiving circuit has a first voltage-controlled oscillator including a first oscillating transistor and generating a local oscillated signal used for receiving the signal on one of the channels, and a first current control means for controlling a collector current of the first oscillating transistor. The transmitting circuit has a second voltage-controlled oscillator including a second oscillating transistor and generating a signal of the frequency of the other channel, and a second current control means for controlling a collector current of the second oscillating transistor. The current control means corresponding to the voltage controlled oscillator generates a signal with a higher one of the frequencies of the predetermined pair of channels increases the collector current of the corresponding oscillating transistor.

5 Claims, 4 Drawing Sheets

TRANSMITTING AND RECEIVING APPARATUS FOR INCORPORATION INTO AN INTEGRATED CIRCUIT

BACKGROUND OF THE INVENTION

The present invention relates to the incorporation on a single chip of a suitable signal transmitting/receiving circuit.

The channel frequencies for low power-type cordless telephones in Japan are as follows.

up channel (portable unit to base unit) 381 MHz band
down channel (base unit to portable unit) 254 MHz band
channel spacing 12.5 kHz.

The circuits shown, for example, in FIG. 1 and FIG. 2 may be considered for cordless telephone receiving and transmitting circuits. These circuits correspond to the above standard, may be incorporated on a single chip, and this IC may be shared by the base unit and portable unit.

Namely, *1 and *2 of FIG. 1 and *1 and *2 of FIG. 2 are connected and the portion surrounded by the chain line is incorporated in a single chip. These figures show the IC1 used for the portable unit with the receiving and transmitting circuits respectively designated with reference numerals 10 and 40.

The receiving circuit 10 has a direct conversion-type structure employing a double super-heterodyning method. i.e. a down channel FM signal Sr from the base unit is received by the antenna 2 and then provided from a terminal T11 to a frequency amplifier 11, on to a terminal T12, then to a band pass filter 3 that allows all of the down channels to pass and then finally via terminal T13 on to first mixer circuits 12 and 22 for performing an orthogonal transformation to an I axis and a Q axis.

Further, an oscillating circuit 30 generates a stabilized reference frequency such as an oscillating frequency of, for example, 14.4 MHz. A crystal oscillating circuit 6 is therefore connected via the terminal T16.

This oscillating signal S30 of the oscillating circuit 30 is then provided to a dividing circuit 35 and divided to a frequency of 1/1152 i.e. the signal S35 of channel spacing frequency 12.5 kHz. This signal S35 is then provided to a PLL 31 as the reference frequency signal, with the dividing ratio N31 being provided to and set-up at a variable dividing circuit (not shown in the drawings) of the PLL 31 via a terminal T17.

An oscillating frequency S31 of a frequency equal to the carrier frequency of the FM signal Sr is then taken out from the VCO311 of the PLL31.

This signal S31 is then provided to the mixer circuit 12 as a first local oscillating signal before being provided to a phase-shifting circuit 32, where the signal S31 is phase-shifted by just $\pi/2$, with this phase-shifted signal S32 then being provided to the mixer 22 as the first local oscillating signal.

Therefore, as shown in FIG. 3A, the receiving signal Sr has a signal component Sa within the lower side waveband and a signal component Sb within the upper side waveband. Further, taking ωo: the carrier frequency (angular frequency) of the received signal Sr
ωa: angular frequency of signal component Sa. ωa<ωo
Ea: amplitude of signal component Sa
ωb : angular frequency of signal component Sb. ωb<ωo
Eb: amplitude of signal component Sb
Δωa=ωo−ωa
Δωb=ωb−ωo, then, Sr=Sa+Sb
Sa=Ea·sinωat
Sb+Eb·sinωbt.

Further, taking

E1: the amplitude of the first local oscillating signals S31 and S32, then

S31=E1·sinωot
S32=E1·cosωot.

Therefore, taking

S12, S22: output signals of the mixer circuits 12 and 22, then, $$S12 = Sr \cdot S31$$
$$= (Ea \cdot \sin\omega at + Eb \cdot \sin\omega bt) \times E1 \cdot \sin\omega ot$$
$$= \alpha a\{-\cos(\omega a + \omega o)t + \cos(\omega o - \omega a)t\} +$$
$$\alpha b\{-\cos(\omega b + \omega o)t + \cos(\omega b - \omega o)t\}$$
$$= \alpha a\{-\cos(\omega a + \omega o)t + \cos\Delta\omega at\} +$$
$$\alpha b\{-\cos(\omega b + \omega o)t + \cos\Delta\omega bt\}$$

$$S22 = Sr \cdot S32$$
$$= (Ea \cdot \sin\omega at + Eb \cdot \sin\omega bt) \times E1 \cdot \cos\omega ot$$
$$= \alpha a[\sin(\omega a + \omega o)t - \sin(\omega o - \omega a)t] +$$
$$\alpha b\{\sin(\omega b + \omega o)t + \sin(\omega b - \omega o)t\}$$
$$= \alpha a\{\sin(\omega a + \omega o)t - \sin\Delta\omega at\} +$$
$$\alpha b\{\sin(\omega b + \omega o)t + \sin\Delta\omega bt\}$$

wherein $\alpha a = Ea \cdot E1/2$
$\alpha b = Eb \cdot E1/2$.

The signals S12 and S22 are provided to the low pass filters 13 and 23 since the signal components with the angular frequencies Δωa and Δωb are necessary for an intermediate frequency (hereinafter referred to as IF) signal. The signal components with the angular frequencies Δωa and Δωb are provided as the first IF signals S13 and S23 from the low pass filter 13. The signals S13 and S23 are expressed as follows:

$$S13 = \alpha a \cdot \cos \Delta\omega at + \alpha b \cdot \cos \Delta\omega bt$$
$$S23 = -\alpha a \cdot \sin \Delta\omega at + \alpha b \cdot \sin \Delta\omega bt.$$

In this case, as being apparent from the above equations and FIG. 3A, the signals S13 and S23 are baseband signals.

These signals S13 and S23 are provided to the second mixer circuits 14 and 24 for I axis and Q axis of orthogonal transformation.

The oscillated signal S30 from the oscillating circuit 30 is provided to the frequency dividing circuit 33 and divided into a relatively low frequency signal S33. For example, the signal S33 is divided by 262 to a frequency of about 55 kHz. This signal S33 is provided to the mixer 14 as the second local oscillated signal and provided to the phase shifting circuit 34. The phase-shifting circuit 34 phase-shifts this signal S33 by $\pi/2$. The phase-shifted signal S34 is provided to the mixer 24 as the second local oscillated signal.

Therefore, taking

S33=E2·sinωst
S34=E2·cosωst wherein

E2: amplitude of second local oscillating signals S33 and S34

ωs=2πfs (fs=approximately 55 kHz) and taking:

S14, S24: output signals from the mixers 14 and 24, then, $$S14 = S13 \cdot S33$$

$$= (\alpha a \cdot \cos\Delta\omega a t + \alpha b \cdot \cos\Delta\omega b t) \times E2 \cdot \sin\omega s t$$

$$= \beta a \{\sin(\Delta\omega a + \omega s)t - \sin(\Delta\omega a - \omega s)t\} +$$

$$\beta b \{\sin(\Delta\omega b + \omega s)t - \sin(\Delta\omega b - \omega s)t\}$$

$$S24 = S23 \cdot S34$$

$$= (-\alpha a \cdot \sin\Delta\omega a t + \alpha b \cdot \sin\Delta\omega b t) \times E2 \cdot \cos\omega s t$$

$$= -\beta a \{\sin(\Delta\omega a + \omega s)t + \sin(\Delta\omega a - \omega s)t\} +$$

$$\beta b \{\sin(\Delta\omega b + \omega s)t + \sin(\Delta\omega b - \omega s)t\}$$

wherein

βa=αa·E2/2

βb=αb·E2/2.

The equations for signals S14 and S24 are transformed so that the value for the frequency difference does not become negative.

$$S14 = \beta a \{\sin(\Delta\omega a + \omega s)t + \sin(\omega s - \Delta\omega a)t\} +$$

$$\beta b \{\sin(\Delta\omega b + \omega s)t + \sin(\omega s - \Delta\omega b)t\}$$

$$= \beta a \cdot \sin(\omega s + \Delta\omega a)t + \beta a \cdot \sin(\omega s - \Delta\omega a)t +$$

$$\beta b \cdot \sin(\omega s + \Delta\omega b)t + \beta b \cdot \sin(\omega s - \Delta\omega b)t$$

$$S24 = -\beta a \{\sin(\Delta\omega a + \omega s)t - \sin(\omega s - \Delta\omega a)t\} +$$

$$\beta b \{\sin(\Delta\omega b + \omega s)t - \sin(\omega s - \Delta\omega b)t\}$$

$$= -\beta a \cdot \sin(\omega s + \Delta\omega a)t + \beta a \cdot \sin(\omega s - \Delta\omega a)t +$$

$$\beta b \cdot \sin(\omega s + \Delta\omega b)t - \beta b \cdot \sin(\omega s - \Delta\omega b)t$$

The signals S14 and S24 are then provided to an adding circuit 15 and added to each other. The resultant added signal expressed by the following equation is provided from the adding circuit 15.

$$S15=S14+S24=2\beta a \cdot \sin(\omega s - \Delta\omega a)t + 2\beta b \cdot \sin(\omega s + \Delta\omega b)t$$

The added signal S15 has signal components as shown in FIG. 3B. This signal S15 is produced from the received signal Sr by replacing in the signal frequency conversion of the carrier frequency (angular frequency) with ωs. The signal S15 is the second IF signal having intermediate frequency fs.

The second IF signal S15 is provided to the FM demodulating circuit 18 via a bandpass filter 16 as an IF filter and a limiter amplifier 17 and is then demodulated to the original audio signal. This audio signal is provided to the speaker 4 of a telephone receiver via an amplifier 19 and the terminal T14.

The above description is for the configuration and operation of the receiving circuit 10.

On the other hand, the transmitting circuit 40 processes an audio signal as an up channel FM signal. The divided signal S35 from the dividing circuit 35 is provided to the PLL 43 as a reference frequency signal. The dividing ratio N43 is provided to and set-up at a variable frequency dividing circuit (not shown in the drawings) of the PLL 43 via a terminal T18.

The up channel carrier frequency signal St received at the receiving circuit 10 that is paired with the down channel is provided from the VCO 431 of the PLL43.

The audio signal from the microphone 5 of the telephone receiver is provided to a low pass filter 42 via a terminal T15 and an amplifier 41 so that unnecessary band components are removed. An output signal from the low pass filter 42 is provided to the VCO 431 of the PLL 43 as an oscillating frequency control signal.

The audio signal from the low pass filter 42 is frequency-modulated at the VOC 431 to produce an FM signal St on the up channel signal that is paired with the down channel.

The FM signal St is extracted from the terminal T19 via the drive amplifier 44 and the output amplifier 45 and provided to the antenna 2.

The above description is for a description of the configuration and operation of the transmitting circuit 40.

If the FM receiver is a typical FM receiver, the intermediate frequency is a high frequency such as 10.7 MHz. The intermediate filter should be therefore constructed from ceramic filters, and thus, cannot be integrated into an IC.

However, with the aforementioned receiving circuit 10, the first IF signals S12 and S22 are baseband signals and the second intermediate frequency fs is a low frequency, such as 55 kHz. The filters 13, 23 and 16 may therefore be constructed from active filters having resistors, capacitors and amplifiers. The receiving circuit 10, with the exception of the filter 3 and the oscillating coil (not shown in the drawings) of the VCO311, can therefore be formed into an IC. Likewise, the transmitting circuit 40 can be formed into an IC.

The entire receiving circuit 10 and the transmitting circuit 40 shown in FIG. 1 and FIG. 2 can therefore be formed into a single monolithic IC.

In FIG. 1 and FIG. 2, this IC is used for a portable unit. However, connecting the terminals T14 and T15 to the 4 line/2 line conversion circuit and replacing the frequency-dividing ratios N31 with N43 allow the IC to be usable in the base unit. In this case, receiving of the up channel signal is carried out by the receiving circuit 10 and the transmitting of the down channel signal is performed by the transmitting circuit 20.

This IC1 is therefore usable in both a base unit and a portable unit.

The VCO's 311 and 431 of the PLL's 31 and 43 are, as shown for example in FIG. 4, usually configured with Colpitts oscillating circuits.

In such a circuit, the base of a transistor Q1 is connected to a power supply terminal T2 via a resistor R1. Capacitors C1 and C2 are connected between the base and ground. A capacitor C3 and a coil L1 are connected in series between this base and ground, as are a capacitor C4 and a variable capacitance diode D1.

Further, the collector of the transistor Q1 is connected to a terminal T2 and a capacitor C5 is connected between the collector and ground. The emitter of the transistor Q1 is grounded via a resistor R2 and connected to the node of the capacitors C1 and C2. A control voltage VC is supplied to the variable capacitance diode D1 via the terminal T1 and a resistor R3.

The control voltage VC to the VCO311 is an error voltage indicating an oscillated frequency error, while the control voltage to the VCO431 is a voltage that is the sum of an error voltage indicating the oscillated frequency error and an audio signal voltage for modulation.

In this case, the circuit for determining the oscillated frequency of the VCO's 311 and the 431 is simply represented by the equivalent circuit in FIG. 5A. Assuming as follows:

CS: minimum capacitance of the variable capacitance diode D1

$\Delta C$: increase in capacitance of the diode D1 due to the control voltage VC ($\Delta C > 0$)

$\omega$: oscillated frequency (carrier frequency) of circuits 311 and 431, and $\omega 0$: the oscillating frequency of the circuits 311 and 431 when $\Delta C = 0$.

The oscillated frequency $\omega$ becomes:

$$\omega = \omega 0 \, [CS \, \{1 + \Delta C/(C3 + CS)\}/(CS + \Delta C)]^{**}0.5$$

$$\omega 0 = 1/\{L1 \cdot C3 \cdot CS/(C3 + CS)\}^{**}0.5$$

(where $X^{**}0.5$ indicates X to the power of ½).

It therefore follows that the oscillating signal S31 or the FM signal St is outputted from the transistor Q1.

At this time, $\Delta \omega$: the variation in the oscillated frequency $\omega$, then, $$\Delta \omega = C/(2CS) \cdot \omega 0/(1 + CS/C3).$$

That is, when the variation $\Delta C$ in the capacitance of the variable capacitance diode D1 is fixed, the variation $\Delta \omega$ becomes larger as the oscillating frequency $\omega 0$ becomes higher.

In order to avoid this, it is necessary to make the capacitance CS larger in proportion to the oscillating frequency $\omega 0$.

Further, the strength of the oscillated signal (FM signal) from the VCO's 311 and 431 is determined in accordance with the oscillation start conditions. Obtaining these oscillating conditions from the equivalent circuit in FIG. 5B for the sake of simplicity, then, $$CS1 = CS2 = 2CS$$

and taking the easiest conditions for oscillation:

gm: mutual conductance of the transistor Q1.

This is proportional to the collector current of the transistor Q1.

Taking,

Q: Q of tuning circuit, then $$gm \geq 2\omega 0 CS/Q.$$

Therefore, if the Q of the tuning circuit is fixed, it is necessary to make the mutual conductance gm larger in proportion to the oscillated frequency $\omega 0$.

It is also necessary for the mutual conductance gm to be made larger when the capacitance CS is made larger in proportion to the oscillated frequency $\omega 0$ so that the variation $\Delta \omega$ does not become large regardless of the increase of the oscillated frequency. That is, when the oscillating frequency $\omega 0$ is high, it is necessary to increase the mutual conductance gm.

To use the IC1 in both the base unit and the portable unit, the oscillated frequencies for the VCO's 311 and 431 are determined as follows:

when the IC1 is used in a portable unit;

the oscillated frequency of the VCO311 is at 254 MHz band (down channel) and the oscillated frequency of the VCO431 is at 381 MHz band (up channel)

and when the IC1 is used in a base unit;

the oscillated frequency of the VCO311 is at 381 MHz band (up channel) and the oscillated frequency of the VCO431 is at 254 MHz band (down channel).

Thus, the frequency relationships are reversed in individual units.

Therefore, when the IC1 is made usable in both the base unit and the portable unit, the VCO's 311 and 431 have to be able to oscillate at both the 254 MHz and the 381 MHz bands.

However, if the oscillating frequency of the VCO's 311 and 431 is made high, then the mutual conductance of the transistor Q1 increases. Otherwise, the oscillating conditions are not fulfilled so that an oscillated signal is not produced.

The present invention resolves such problems.

SUMMARY OF THE INVENTION

In order to resolve these problems, in the present invention a transmitting and receiving apparatus configured in superheterodyne form includes a receiving circuit and a transmitting circuit. The receiving circuit is for receiving a signal on one channel of a predetermined pair of channels and the transmitting circuit is for transmitting a signal on the other channel of the predetermined pair of channels. The receiving circuit has a first voltage-controlled oscillator, including a first oscillating transistor and generating a local oscillated signal used for receiving the signal on one of the channels, and a first current control means for controlling a collector current of the first oscillating transistor. The transmitting circuit has a second voltage-controlled oscillator including a second oscillating transistor and generating a signal of the frequency of the other channel, and a second current control means for controlling a collector current of the second oscillating transistor. One of the first and second current control means corresponding to one of the first and the second voltage controlled oscillator generating a signal with a higher one of the frequencies of the predetermined pair of channels increases the collector current of the corresponding one of the first and the second oscillating transistors.

Further, the first current control means includes a first resistor and a series circuit of a second resistor and a first switch means connected in parallel between the emitter of the first oscillating transistor and the ground, and the second current control means includes a third resistor and a series circuit of a fourth resistor and a second switch means connected in parallel between the emitter of the second oscillating transistor and the ground.

Moreover, the first switch means and the second switch means may be switching transistors and the first and second voltage-controlled oscillators may be Colpitts oscillators.

Still further, according to the present invention, in a cordless telephone system in which a base unit and a portable unit both have transmitting circuits and receiving circuits configured in superheterodyne form and the base unit and the portable unit transmit and receive signals therebetween using a predetermined pair of channels, each of the receiving circuits of the base unit and portable unit has a first voltage-controlled oscillator including a first oscillating transistor and generating a local oscillated signal used for receiving a signal on the respective receiving channel of the predetermined pair of channels, and a first current control means for controlling a collector current of the first oscillating transistor. Further, each of the transmitting circuits of the base unit and portable unit has a second voltage controlled oscillator including a second oscillating transistor and generating a signal with a frequency of a transmitting channel different from a frequency of the respective receiving channel of the predetermined pair of channels, and a second current control means for controlling a collector current of the second oscillating transistor. At each of the base unit and the portable unit, one of the first and the second current control means corresponding to one of the first and the second voltage controlled oscillators generating a signal with a higher one of the frequencies of the predetermined pair of channels increases a collector current of the corresponding one of the first and the second oscillating transistors.

DETAILED DESCRIPTION OF THE INVENTION

Embodiment

Figure 1:
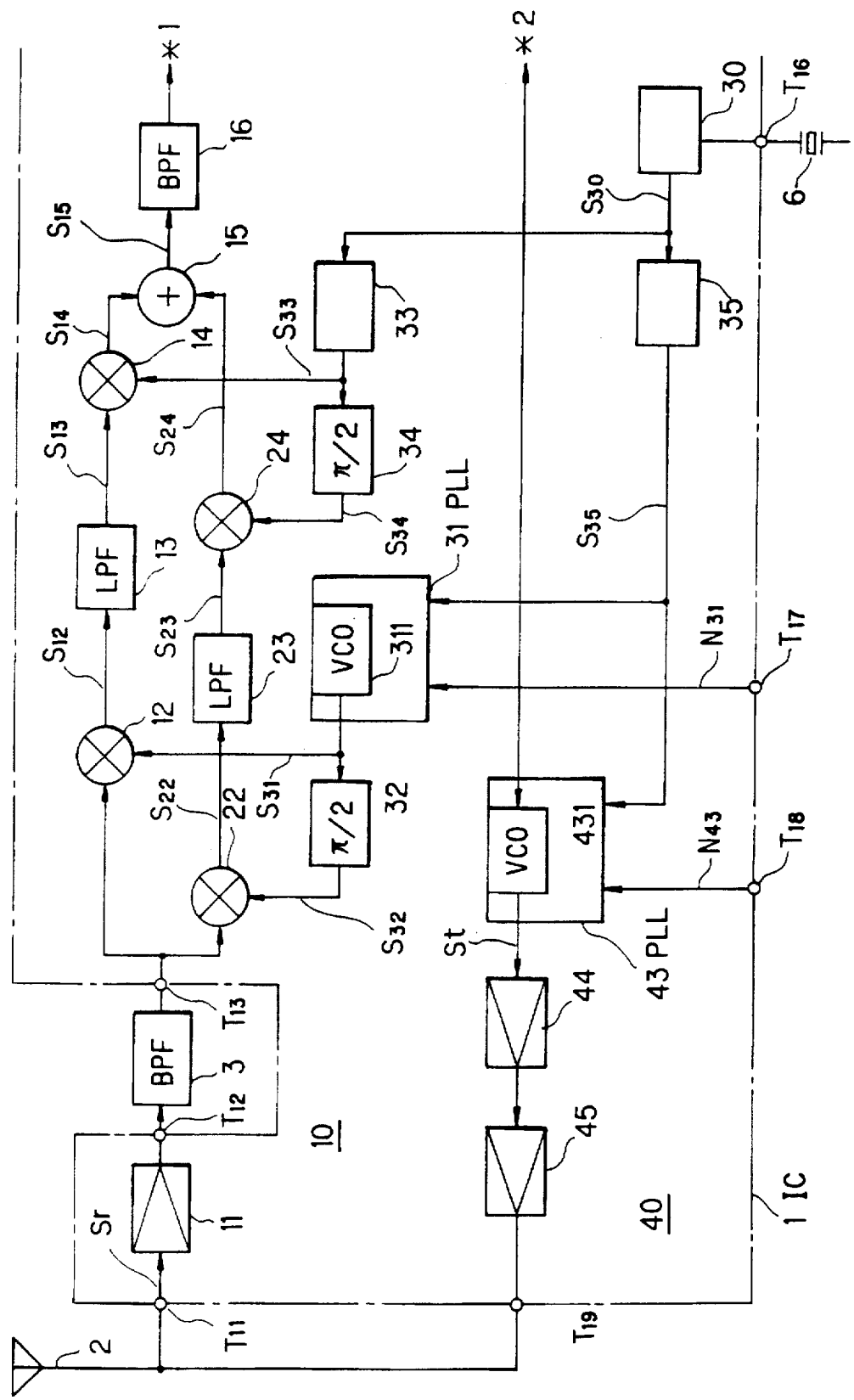
FIG. 1 is a system diagram showing an example of a portion of a portable unit circuit.
Figure 2:
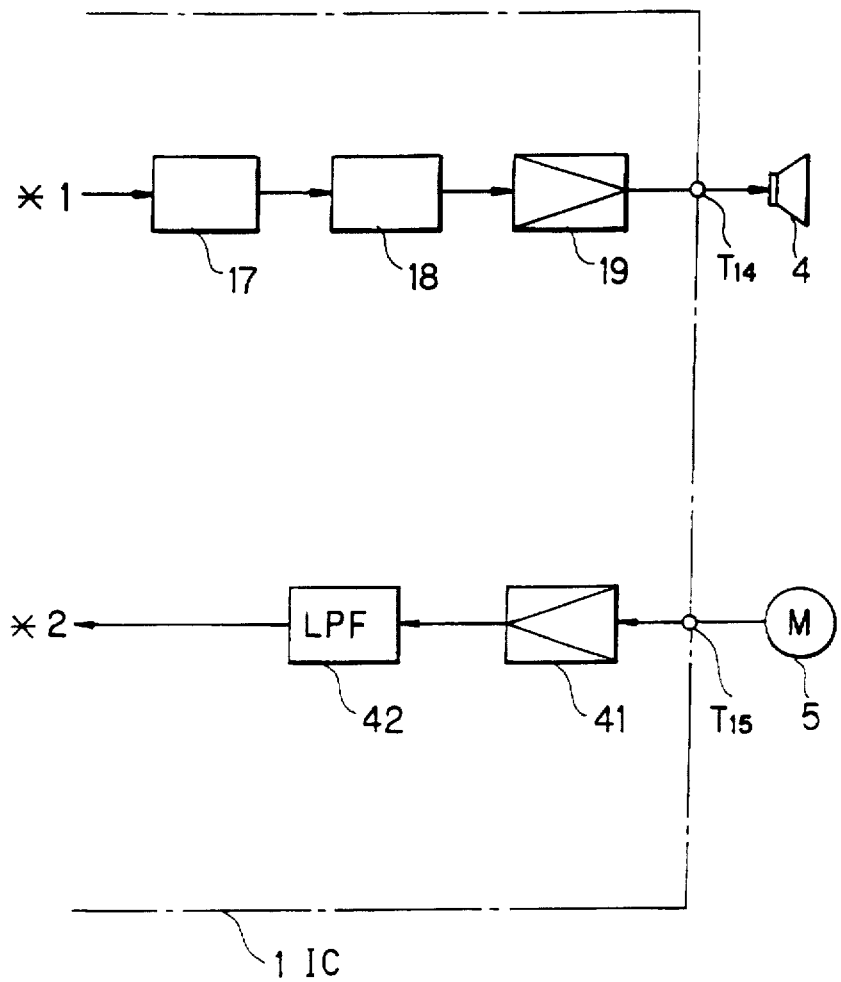
FIG. 2 is a system diagram showing a continuation of the example of the portion of the portable unit circuit of FIG. 1.
Figure 3A:
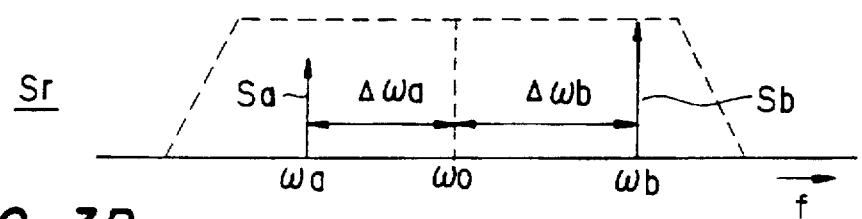
FIG. 3A and FIG. 3B are a graph illustrating the operation of the circuit of FIG. 1 and FIG. 2.
Figure 3B:
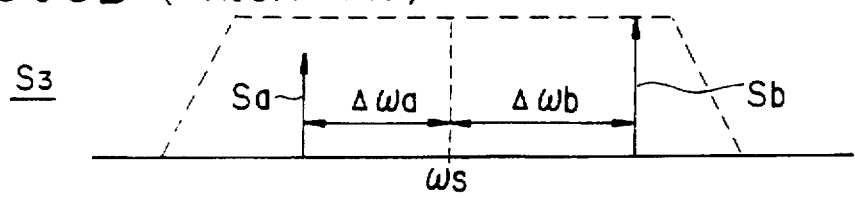
Figure 4:
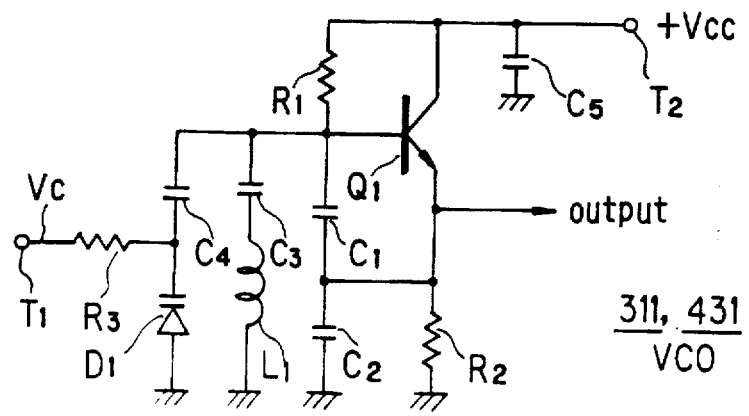
FIG. 4 is a system diagram illustrating Colpitts oscillator circuit.
Figure 5A:
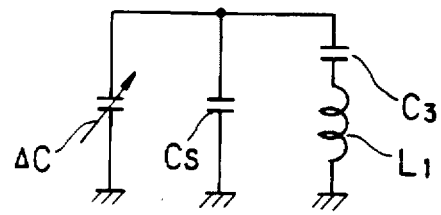
FIG. 5A and FIG. 5B are diagrams illustrating the operation of the circuit of FIG. 4.
Figure 5B:
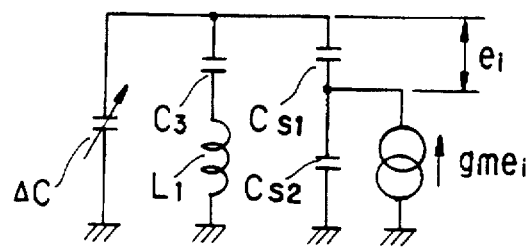
Figure 6:
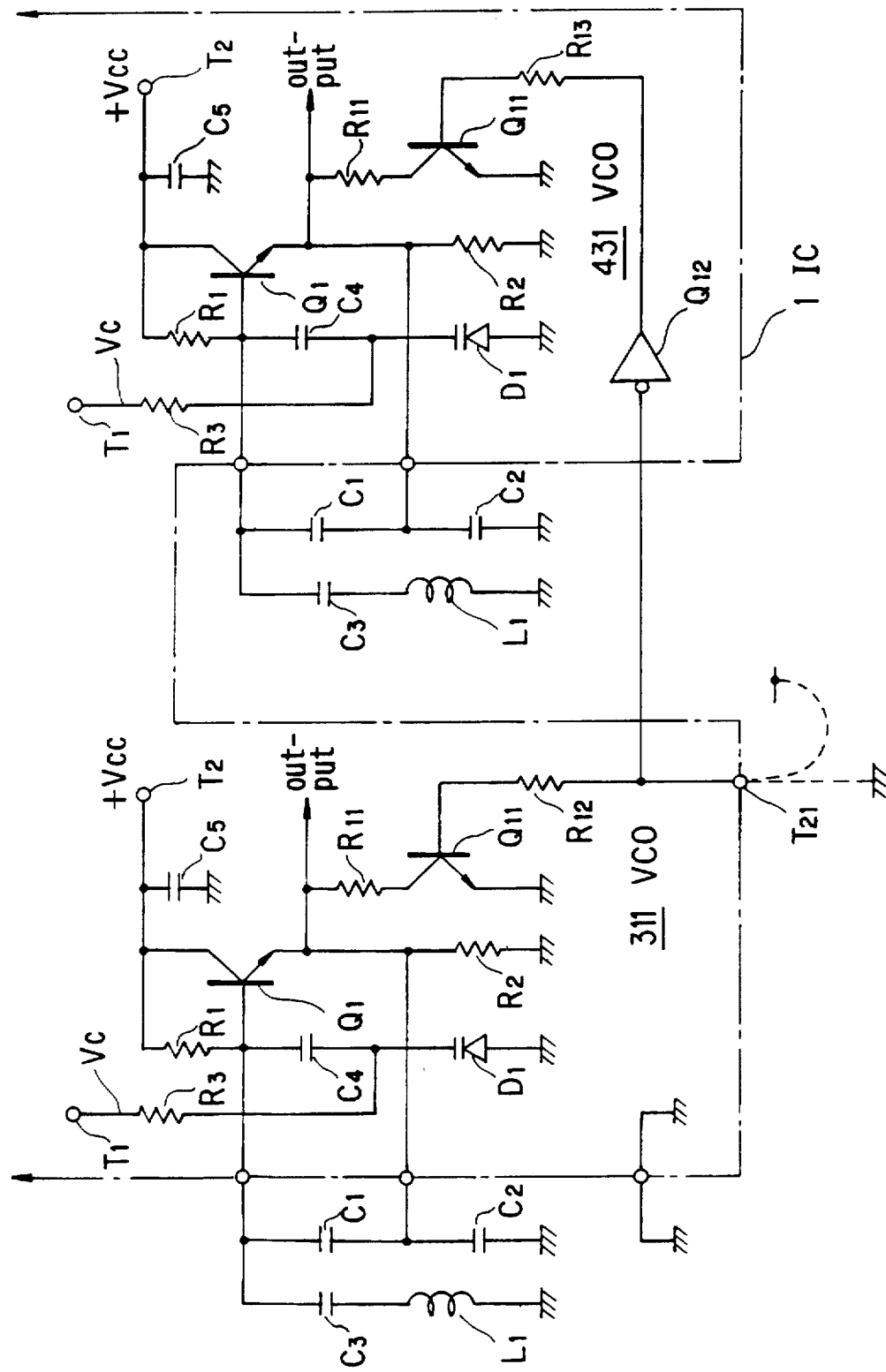
FIG. 6 is a connection diagram showing an example of the present invention.

In FIG. 6, VCO311 is configured as being described with reference to FIG. 4, and a resistor R11 and the collector and the emitter of the transistor Q11 are connected in series between the emitter of the transistor Q1 and ground. The VCO 431 also has the same configuration.

However, in this case, as shown by the surrounding dot line, the portion with the exclusion of the elements C1 to C3 and L1 is formed within an IC1 and the elements C1 to C3 and L1 are attached to the IC1 via an external terminal.

Further, an external terminal T21 is connected to the base of the transistor Q11 for the switch operation of the VCO311 via a resistor R12 and also connected to the base of the transistor Q11 for the switch operation of the VCO431 via an inverter Q12 and a resistor R13.

Moreover, as shown by the dashed line, the terminal T21 is grounded when the IC1 is used in the portable unit, and is provided with the power supply voltage when used in the base unit.

With such configuration, at a portable unit, the transistor Q11 of the VC0311 turns off since the terminal T21 is grounded. Thus, the collector current of the transistor Q1 of the VC0311 is determined by the resistors R1 and R2. The mutual conductance gm corresponds to the magnitude of this collector current. The VC0311 therefore oscillates at an appropriate intensity by selecting resistances of the resistors R1 and R2 beforehand to produce an oscillated signal.

Further, the transistor Q11 of the VC0431 is turned on so that the resistor R11 is connected in parallel with the resistor R2 since the terminal T21 is grounded. The collector current of the transistor Q1 of the VC0431 is determined by the resistors R1, R2 and R11 and becomes larger than the collector current of the transistor Q1 for the VC0311. The mutual conductance gm therefore becomes larger than the mutual inductance gm of the transistor Q1 of the VC0311.

The VCO431 therefore oscillates to produce the oscillated signal (FM signal) at an appropriate intensity by selecting resistances of the resistor R11 beforehand even if the oscillated frequency of the VC0311 is made high.

Further, at the base unit, since the terminal T21 is up to the power supply voltage, the transistor Q11 of the VCO311 is turned on and the transistor Q11 of the VCO431 is turned off. This relationship is opposite to that at the portable unit. Therefore, in this case, VCO311 and VCO431 oscillate with appropriate intensity in respective frequency bands to produce the oscillation signals.

The VCO311 and VCO431 produce the oscillation signals with the appropriate intensity in both the portable unit and the base unit. The IC1 may therefore be commonly used for either the portable unit or the base unit.

Further, the collector current can be made smaller at the transistor Q1 of one of the VCO's 311 and 431 of which the oscillated frequency is lower than that at the transistor Q1 of the other, so that the current consumed may therefore be made small.

This invention has been applied to a low power-type cordless telephone in the above description. However, this invention is suitable for transmitting/receiving devices having dual channels. Further, at the VCO431, two variable capacitance diodes may be provided such that an error voltage indicative of the frequency error is provided to one of the diodes and an audio signal voltage is provided to the other.

According to this invention, an oscillated signal with an appropriate strength is produced and the IC1 is commonly used in both the base unit or the portable unit of a cordless telephone.

Further, the collector current can be made smaller at the transistor Q1 of one of the VCO's 311 and 431 of which the oscillated frequency is lower than that at transistor Q1 of the other, so that the current consumed may therefore be made small.

While the invention has been particularly shown and described with reference to the preferred embodiment thereof, it will be understood by those skilled in the art that the other changes in form and details can be made therein without departing from the spirit and scope of the invention.

What is claimed is:

1. A transmitting and receiving apparatus configured in superheterodyne form, said apparatus including a receiving circuit for receiving a signal on one channel of a predetermined pair of channels and a transmitting circuit for transmitting a signal on the other channel of the predetermined pair of channels, wherein the improvement comprises:

said receiving circuit has a first voltage-controlled oscillator which includes a first oscillating transistor and generates a local oscillated signal used for receiving the signal on one of the predetermined pair of channels, and a first current control means for controlling a collector current of the first oscillating transistor, said transmitting circuit has a second voltage-controlled oscillator which includes a second oscillating transistor and generates a signal of a frequency of the other channel, and a second current control means for controlling a collector current of the second oscillating transistor, and one of the first and the second current control means which corresponds to one of the first and the second voltage controlled oscillators that generates a signal with a higher one of the frequencies of the predetermined pair of channels increases the collector current of the corresponding one of the first and the second oscillating transistors.

2. A transmitting and receiving apparatus according to claim 1, wherein the first current control means includes a first resistor and a series circuit of a second resistor and a first switch means connected in parallel between an emitter of the first oscillating transistor and ground, and the second current control means includes a third resistor and a series circuit of a fourth resistor and a second switch means connected in parallel between an emitter of the second oscillating transistor and the ground.

3. A transmitting and receiving apparatus according to claim 2, wherein the first switch means and the second switch means are switching transistors.

4. A transmitting and receiving apparatus according to claims 1, wherein the first and second voltage-controlled oscillators are Colpitts oscillators.

5. A cordless telephone system with a base unit and a portable unit at least one of said base unit and said portable unit having a transmitting circuit and a receiving circuit configured in superheterodyne form, wherein the base unit and the portable unit transmit and receive signals therebetween using a predetermined pair of channels, wherein the improvement comprises:

the receiving circuit at one of the base unit and the portable unit has a first voltage-controlled oscillator including a first oscillating transistor and generating a local oscillated signal used for receiving a signal on a respective transmitting channel of the predetermined pair of channels, and a first current control means for controlling a collector current of the first oscillating transistor, and the transmitting circuit at one of the base unit and the portable unit has a second voltage controlled oscillator including a second oscillating transistor and generating a signal with a frequency of a transmitting channel different from a frequency of a respective transmitting channel of the predetermined pair of channels, and a second current control means for controlling a collector current of the second oscillating transistor, and one of the first and the second current control means which corresponds to one of the first and the second voltage-controlled oscillators that generates a signal with a higher one of the frequencies of the predetermined pair of channels increases the collector current of the corresponding one of the first and the second oscillating transistors.

\* \* \* \* \*